United States Patent
Tojo et al.

(10) Patent No.: US 10,643,096 B2
(45) Date of Patent: May 5, 2020

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Hiroshi Tojo, Fuchu (JP); Masahiro Ariizumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 15/711,384

(22) Filed: Sep. 21, 2017

(65) Prior Publication Data
US 2018/0089529 A1    Mar. 29, 2018

(30) Foreign Application Priority Data
Sep. 23, 2016   (JP) ................. 2016-186143

(51) Int. Cl.
    *G06K 9/00*    (2006.01)
    *G06K 9/46*    (2006.01)
    (Continued)

(52) U.S. Cl.
    CPC ......... *G06K 9/4609* (2013.01); *G06K 9/3233* (2013.01); *G06K 9/4642* (2013.01);
    (Continued)

(58) Field of Classification Search
    CPC .. G06K 9/4609; G06K 9/3233; G06K 9/4642; G06K 9/6202; G06T 7/254;
    (Continued)

(56) References Cited

U.S. PATENT DOCUMENTS 8,923,646 B2 *   12/2014   Pham ................. G06T 7/155
                                                  382/275
9,691,155 B2     6/2017    Tojo et al.
                (Continued)

FOREIGN PATENT DOCUMENTS

JP    2015197816 A    11/2015

OTHER PUBLICATIONS

Achanta et al. "SLIC Superpixels", EPFL Technical Report 149300, Jun. 2010, pp. 1-15.
Maruyama, "Real-time K-Means Clustering for Color Images on Reconfigurable Hardware", Proceedings of the 18th International Conference on Pattern Recognition, 2006, pp. 816-819, vol. 2.

*Primary Examiner* — Sean T Motsinger
(74) *Attorney, Agent, or Firm* — Rossi, Kimms & McDowell LLP (57) ABSTRACT

There is provided with an image processing apparatus. An obtaining unit obtains a video with consecutive frame images. A dividing unit divides a frame image of interest into a plurality of divided regions by reference to information of divided regions previously stored in a storage unit. A determining unit determines whether or not a moving object is included in a divided region of interest in the frame image of interest. An updating unit switches whether or not to update information of the divided region of interest stored in the storage unit with information of the divided region of interest of the frame image of interest, according to whether or not a moving object is included in the divided region of interest in the frame image of interest.

13 Claims, 7 Drawing Sheets

(51) Int. Cl.
*G06K 9/62* (2006.01)
*G06K 9/32* (2006.01)
*G06T 7/174* (2017.01)
*G06T 7/254* (2017.01)
*G06T 7/11* (2017.01)
*G06T 7/30* (2017.01)

(52) U.S. Cl.
CPC .............. *G06K 9/6202* (2013.01); *G06T 7/11* (2017.01); *G06T 7/174* (2017.01); *G06T 7/254* (2017.01); *G06T 7/30* (2017.01); *G06T 2207/10016* (2013.01); *G06T 2207/20021* (2013.01); *G06T 2207/30232* (2013.01)

(58) Field of Classification Search
CPC ... G06T 7/11; G06T 7/30; G06T 7/174; G06T 2207/10016; G06T 2207/20021; G06T 2207/30232
See application file for complete search history.

(56) References Cited

U.S. PATENT DOCUMENTS

| | | |
|---|---|---|
| 2007/0237387 A1 | 10/2007 | Avidan et al. |
| 2015/0262367 A1* | 9/2015 | Doppler .................. G06T 5/002 382/164 |
| 2015/0279049 A1* | 10/2015 | Tojo ..................... G06K 9/4609 382/164 |
| 2016/0155237 A1* | 6/2016 | Hashiguchi ............... G06T 7/11 382/173 |
| 2016/0189388 A1* | 6/2016 | Gupta ...................... G06T 7/11 382/180 |
| 2016/0210755 A1* | 7/2016 | Jachalsky ............... G06T 7/174 |
| 2016/0267356 A1* | 9/2016 | Hashiguchi ............... G06T 7/11 |
| 2018/0089529 A1* | 3/2018 | Tojo ....................... G06T 7/254 |
| 2018/0174331 A1* | 6/2018 | Pham .................. G06K 9/6215 |
| 2018/0308242 A1* | 10/2018 | Honjo .................... G06T 7/254 |

\* cited by examiner

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and non-transitory computer-readable storage medium.

Description of the Related Art

A method is known in which an image is divided into a plurality of regions by collecting together pluralities of pixels whose attribute information such as color, brightness value, or edge is similar. By using such a method, image processing can be performed in units of the divided regions, and then a calculation amount can be reduced compared to a case where image processing is performed in units of pixels.

In Achanta (R. Achanta et al. "SLIC Superpixels", EPFL Technical Report no. 149300, 2010), a method for dividing an image into a plurality of regions by performing clustering of pixel data by using a five-dimensional space distance in which color information (represented by a Lab color space) and coordinates (X,Y) are combined is disclosed. The method recited in Achanta is referred to as Simple Linear Iterative Clustering (SLIC) and is a method based on a k-means method which is one method of clustering. Specifically, clustering is performed based on representative points arranged in a lattice pattern in an image. Additionally, region division results converge by repeatedly re-performing clustering using the XY coordinate barycenter and color average of the divided region obtained by the clustering as the representative point and the color information.

In Pham (U.S. Pat. No. 8,923,646), performing similar processing by using a Geodesic distance in place of using a distance of color information and coordinates is disclosed. A Geodesic distance is a distance measured based on a gradient of brightness between pixels. Even if a distance is small at the coordinates in a proximity of where an edge exists such as at a boundary of an object, because a Geodesic distance is large, a region division along the boundary of the object becomes possible by using the Geodesic distance.

However, in a case where the region division processing is applied to a moving image, the number of times that processing is repeated is restricted because it is necessary to end the processing on each frame image within a predetermined amount of time in order to perform the processing in real time. For this reason, there are cases in which the division results are not stable. A method in which a representative point of a divided region calculated in a current frame image is used as an initial value of a representative point in a next frame image is described as a method for solving this problem in Maruyama (T. Maruyama, "Real-time K-Means Clustering for Color Images on Reconfigurable Hardware", Proceedings of the 18th International Conference on Pattern Recognition, vol. 2, pp. 816-819, 2006).

SUMMARY OF THE INVENTION

According to an embodiment of the present invention, an image processing apparatus comprises: an obtaining unit configured to obtain a video with consecutive frame images; a dividing unit configured to divide a frame image of interest into a plurality of divided regions by reference to information of divided regions previously stored in a storage unit; a determining unit configured to determine whether or not a moving object is included in a divided region of interest in the frame image of interest; and an updating unit configured to switch whether or not to update information of the divided region of interest stored in the storage unit with information of the divided region of interest of the frame image of interest, according to whether or not a moving object is included in the divided region of interest in the frame image of interest.

According to another embodiment of the present invention, an image processing method comprises: obtaining a video with consecutive frame images; dividing a frame image of interest into a plurality of divided regions by reference to previously stored information of divided regions; determining whether or not a moving object is included in a divided region of interest in the frame image of interest; and switching whether or not to update the previously stored information of the divided region of interest with information of the divided region of interest of the frame image of interest, in accordance with whether or not a moving object is included in the divided region of interest in the frame image of interest.

According to another embodiment of the present invention, a non-transitory computer-readable medium stores a program for causing a computer to: obtain a video with consecutive frame images; divide a frame image of interest into a plurality of divided regions by reference to previously stored information of divided regions; determine whether or not a moving object is included in a divided region of interest in the frame image of interest; and switch whether or not to update the previously stored information of the divided region of interest with information of the divided region of interest of the frame image of interest, in accordance with whether or not a moving object is included in the divided region of interest in the frame image of interest.

Further features of the present invention will become apparent from the following description of exemplary embodiments (with reference to the attached drawings).

DESCRIPTION OF THE EMBODIMENTS

In a case where a method of inheriting representative points between frame images is used as in Maruyama, a problem was discovered in that, in a case where a moving object exists within a frame image, an arrangement order of divided regions ends up switching before/after the passing of a moving object.

An embodiment of the present invention provides a method for obtaining stable region division results by suppressing the order of divided regions from switching even in a case where a moving object is present when performing region division processing on each frame image of a moving image.

In Achanta's method, a region division is performed on an image and the region division result is used to perform a region division again. In other words, in Achanta's method, after a region division is performed on an image, a region division is performed again with reference to information of each divided region (color information and barycentric position information for example). Also, in Maruyama's method, after performing a region division on a first frame image, a region division is performed again on a second frame image by using the region division result. In Maruyama's method, using the fact that a change between consecutive frame images contained in the video is often small, by repeating a region division on consecutive frame images, a result that is the same as performing a region division on an individual frame image can be obtained.

Figure 1A:
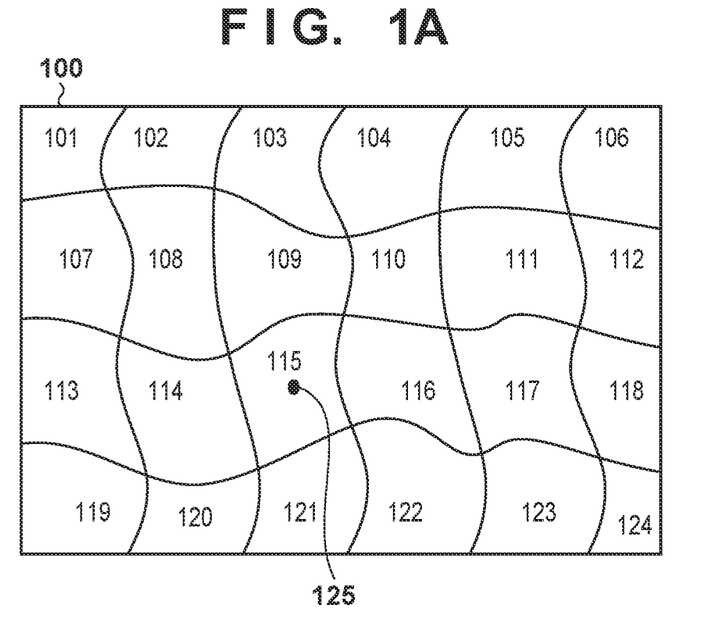
FIGS. 1A and 1B are views for describing a conventional technique.
Figure 1B:
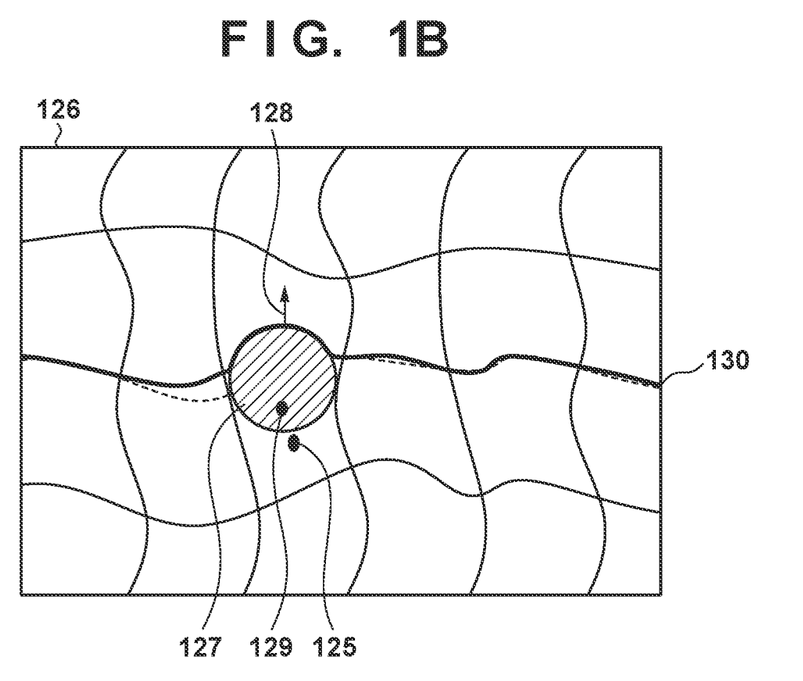

However, it was discovered that a problem occurs in a case where a moving object is present in Maruyama's method. First, a description regarding Maruyama's problem is given with reference to FIGS. 1A and 1B. A frame image 100 and divided regions 101 to 124 are illustrated in FIG. 1A. A solid line illustrates a boundary of the divided regions in FIG. 1A. A representative point 125 of the divided region 115 is illustrated in FIG. 1A. A frame image 126 following the frame image 100 is illustrated in FIG. 1B. A moving object 127 moving upward (direction of an arrow symbol 128) is illustrated in FIG. 1B.

In FIG. 1B, a bold line 130 is a boundary obtained by region division processing on the frame image 126, and the dashed line illustrates the boundary prior to the moving object 127 appearing. The divided region 115 becomes to have a shape that extends in an upwards direction in a case where Achanta's region division method is used because the color of the moving object 127 is similar to the color of the divided region 115 which is a background. For this reason, the position of a representative point 129 of the divided region 115 shifts in the direction of movement of the moving object from the original representative point 125. In this way, the representative point shifts in the direction of movement of the moving object with the movement of the moving object, and ultimately, the divided region 115 switches with the original divided region 109. This phenomenon also occurs in cases where another region division method is used. For example, even in a case where Pham's region division method is used, because the moving object is surrounded by edges, region division tends to be performed along the outline of the moving object, and then the representative point shifts in the direction of movement as a result.

In this way, when the arrangement order of the divided regions switches, subsequent stages of the image processing are influenced. For example, a case where color correction processing is performed by deciding a color correction parameter for each divided region is considered. Because there is little change in the color between frame images when a moving object is not present, processing for deciding color correction parameters for divided regions that did not change much can be omitted by reusing the color correction parameters used in a previous frame. However, when the arrangement order of the divided regions switches, it is determined that there was a change regardless of whether a change actually occurred, and unnecessary processing for deciding color correction parameters ends up being performed. For example, in a case where "A" is added as a region ID to the region 115, it is determined that the region that the region ID "A" indicates has changed because the region ID "A" corresponds to the region 109 after the passing of the moving object. In this way, it was difficult to perform a stable region division in which the arrangement order does not switch with respect to a moving image in the conventional technique.

Hereinafter, embodiments of the present invention are described based on the drawings. However, the scope of the present invention is not limited to the following embodiments.

First Embodiment

Figure 2:
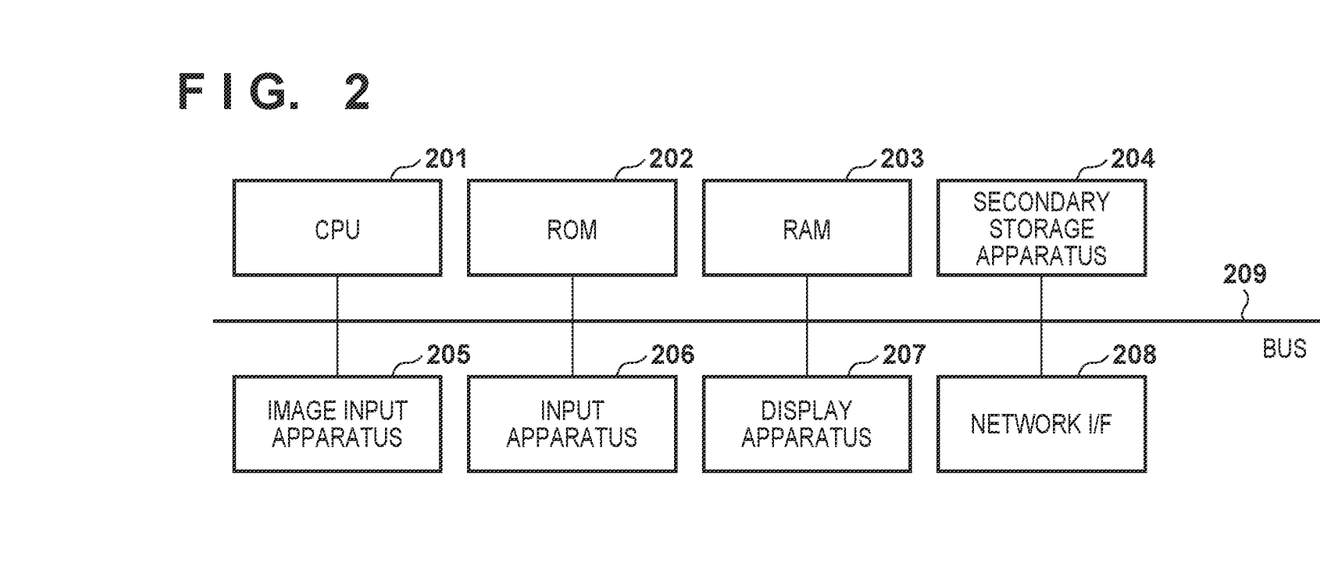
FIG. 2 is a block diagram for illustrating a hardware configuration of an image processing apparatus.

FIG. 2 is a block diagram illustrating the hardware configuration of an image processing apparatus 200 according to the first embodiment of the present invention. The image processing apparatus 200 is equipped with the following configurations. A CPU 201 is a processor for executing commands in accordance with a program stored in a ROM 202 or a RAM 203. The ROM 202 is a non-volatile memory and stores programs for realizing processing according to the present embodiment as well as programs and data necessary for additional control. The RAM 203 is a volatile memory and stores temporary data such as frame image data or pattern classification results. A secondary storage apparatus 204 is a rewritable memory such as a hard disk drive or a flash memory, and stores image information, image processing programs, various setting contents, or the like.

In the present embodiment, the image processing apparatus 200 is implemented as an application that operates on an operating system. Specifically, in the present embodiment, programs that the ROM 202, the secondary storage apparatus 204, or the like store for realizing functions of each unit illustrated in FIG. 3 and the like are read to the RAM 203. Also, functions of each unit illustrated in FIG. 3 and the like are realized by the CPU 201 operating in accordance with programs on the RAM 203. However, functions for each unit illustrated in FIG. 3 and the like can also be realized by hardware such as an ASIC that the image processing apparatus 200 is equipped with.

An image input apparatus 205 is an apparatus for inputting an image to the image processing apparatus 200 such as a digital video camera, a network camera, or an infrared camera, for example. An input apparatus 206 is an apparatus for sending an input from a user to the image processing apparatus 200 such as a keyboard or a mouse, for example. A display apparatus 207 is an apparatus such as a Braun tube CRT or a liquid crystal display for example for displaying processing results and the like to the user. Configuration may be taken such that the image processing apparatus 200 is equipped with an interface to transmit/receive data with the image input apparatus 205, the input apparatus 206, or the display apparatus 207, which are independent apparatuses, via this interface. Additionally, it is possible to connect at least some of the apparatuses, the image input apparatus 205 for example, to the image processing apparatus 200 via a network I/F 208.

The network I/F 208 is an interface between a network, such as the Internet or an intranet, and the image processing apparatus 200, and is a modem, a LAN, or the like, for example. A bus 209 makes it possible to mutually exchange data by connecting each unit described above.

Figure 3:
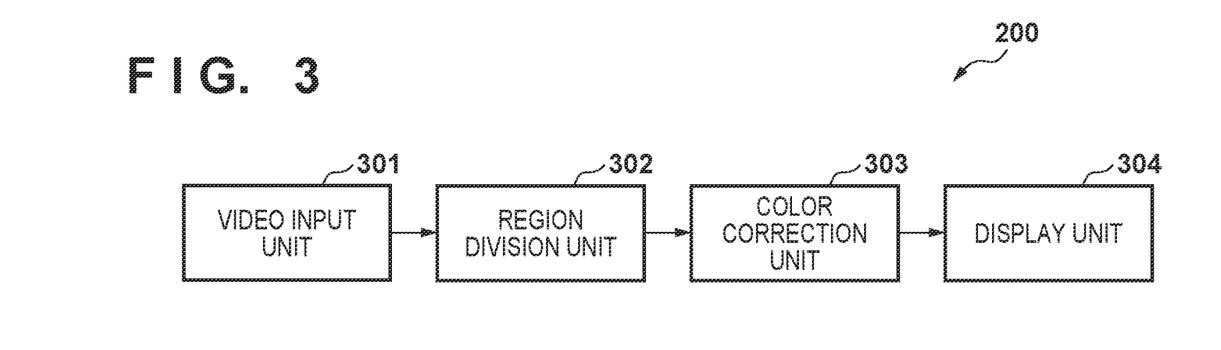
FIG. 3 is a view illustrating a functional configuration of the image processing apparatus.

FIG. 3 is a view illustrating a functional configuration of the image processing apparatus 200 according to the present embodiment. The image processing apparatus 200 is equipped with the following configurations. A video input unit 301 obtains video configured by consecutive frame images. The video input unit 301 obtains a video inputted from the image input apparatus 205 the present embodiment. The inputted video is configured by consecutive frame images.

A region division unit 302 divides a frame image of interest into a plurality of divided regions by referencing information of each divided region stored previously in an attribute storage unit 404. In the present embodiment, the region division unit 302 performs a region division on frame images configuring the inputted video that the video input unit 301 obtained. In the present embodiment, the attribute storage unit 404 stores attribute information of the divided regions and the region division unit 302 performs a region division by using this attribute information. Although the types of attribute information are not particularly limited, description is given of a method (Achanta) that uses a color average and a barycentric position of the divided regions, and a method that uses a barycentric position of the divided regions (Pham) as the attribute information hereinafter. However, it is possible to use information reflecting results of a region division of a previous frame image as divided region information, and, for example, it is possible to use divided region position information indicating a boundary of the divided regions.

A color correction unit 303 performs a color correction on each divided region on frame images. In the present embodiment, although a type of color correction is not particularly limited, it may be an adjustment of the white balance, enhancement processing for a particular color, or the like, for example. However, the type of correction processing is not necessarily limited to a color correction. A display unit 304 causes the display apparatus 207 to display frame images that are color corrected by the color correction unit 303. Note, these configurations may be integrated in the image input apparatus 205. For example, the region division unit 302 can be comprised in an integrated circuit chip and arranged in the image input apparatus 205. In such a case, the image input apparatus 205 can function as the image processing apparatus according to the present embodiment.

Figure 4:
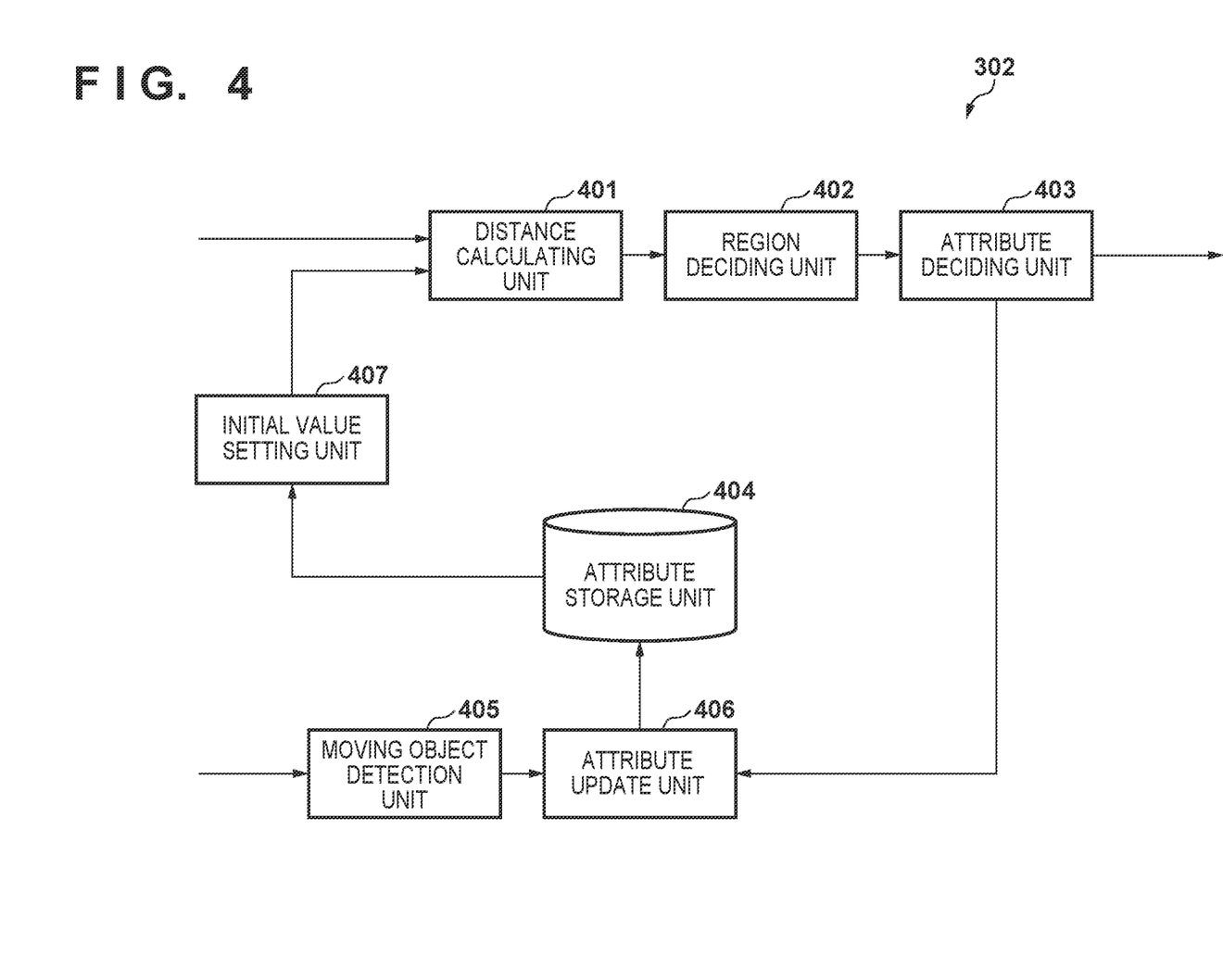
FIG. 4 is a view illustrating a functional configuration of a region division unit according to the first embodiment.

FIG. 4 is a view illustrating a detailed functional configuration of the region division unit 302. The region division unit 302 is equipped with the following configurations. A distance calculating unit 401 calculates a distance between each pixel and representative point within a frame image. A region deciding unit 402 decides the boundaries of the divided regions based on a calculation result by the distance calculating unit 401.

An attribute deciding unit 403 decides attribute information regarding each divided region whose boundaries were decided by the region deciding unit 402. The attribute storage unit 404 stores attribute information regarding the divided regions and can be realized by using a memory such as the RAM 203 or the secondary storage apparatus 204. A moving object detection unit 405 performs moving object detection processing for detecting an object moving (hereinafter referred to as a moving object) in the frame image of interest. By using this detection result, the moving object detection unit 405 or an attribute update unit 406 can determine whether or not the moving object is included in a divided region of interest.

The attribute update unit 406 switches whether or not information of the divided region of interest stored in the attribute storage unit 404 is updated with the information of the divided region of interest in the frame image of interest depending on whether or not a moving object is included in the divided region of interest. In the present embodiment, the attribute update unit 406 updates, based on the result of the detection by the moving object detection unit 405, the attribute information stored in the attribute storage unit 404 by using the attribute information that the attribute deciding unit 403 decided. An initial value setting unit 407 sets, based on the attribute information read from the attribute storage unit 404, initial values of representative points used when the distance calculating unit 401 processes the next frame image.

Figure 5:
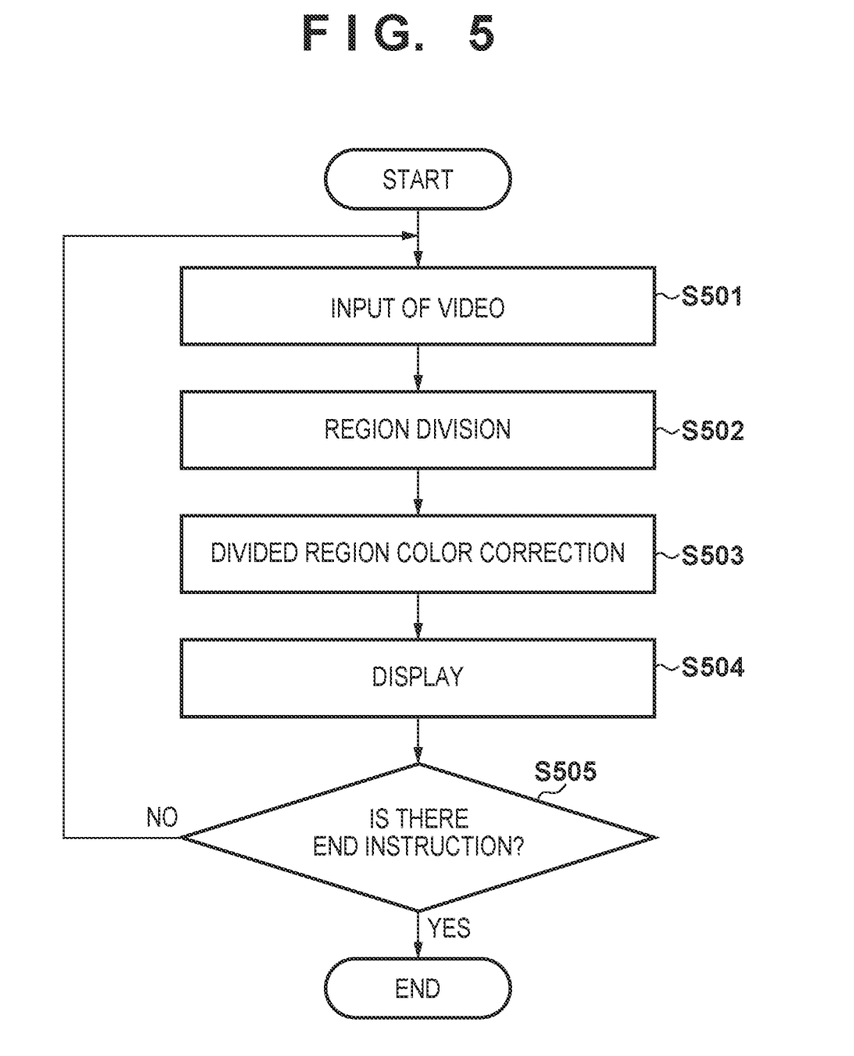
FIG. 5 is a flowchart for illustrating a flow of processing in an image processing method.

Next, description regarding a general flow of processing in the present embodiment is given using FIG. 5. In step S501, the video input unit 301 obtains a frame image configuring the inputted video. For example, it is possible to obtain a frame image at predetermined time intervals by the image input apparatus 205 or the like performing a capture, and the frame images can be inputted to the video input unit 301. In step S502, the region division unit 302 divides the frame image into a plurality of divided regions. Here, the region division unit 302 performs a region division with reference to the representative points, and the divided region corresponding to each representative point is decided. In the present embodiment, identifiers (IDs) are added to the representative points and the divided regions.

In step S503, for each divided region, the color correction unit 303 performs a color correction. The color correction unit 303 can perform color correction processing in accordance with a parameter that differs for each divided region. For example, for each divided region, the color correction unit 303 can decide a parameter of the color correction processing by referencing the image within the divided regions and the image outside of the divided regions as necessary in accordance with a known technique. Also, the color correction unit 303, using the decided parameters, can perform a white balance adjustment using a first parameter with respect to a first divided region and can perform a white balance adjustment using a second parameter with respect to a second divided region, for example.

The color correction unit 303 controls, in accordance with whether or not a difference of a divided region of interest between a previous frame image and the current frame image is equal to or lower than a threshold, whether or not to calculate a parameter for performing correction processing on a divided region of interest of a current frame image. In the present embodiment, for a divided region in which a difference between a current frame image and a previous frame image is equal to or lower than a threshold, the color correction unit 303 omits the processing for calculating a parameter of the color correction processing. On the other hand, for a divided region in which a difference between a current frame image and a previous frame image exceeds the threshold, the color correction unit 303 does not omit the processing for calculating a parameter of the color correction processing.

For example, the color correction unit 303 can determine whether or not a position and shape of a divided region to which the same identifier is added matches between a current frame image and a previous frame image. As another example, the color correction unit 303 can determine whether or not greater than or equal to a predetermined ratio of pixels among the divided region of the current frame image are included in the divided region of the previous frame image to which the same identifier is given. In cases where such a condition is satisfied, the color correction unit 303 can perform color correction processing by using the parameter of the color correction processing used in the previous frame image for that divided region. Such processing can be realized by the region division unit 302 temporarily saving the region division result for the previous frame image to a memory such as the RAM 203, for example.

The display unit 304, in step S504, causes the display apparatus 207 to display a frame image after the color correction processing by the color correction unit 303. In step S505, the video input unit 301 determines whether or not the processing ends. For example, in a case where there is an end instruction from the user such as a power OFF, the video input unit 301 determines that the processing will end. The processing from step S501 to step S504 repeats for each frame image until it is determined that the processing ends.

Figure 6:
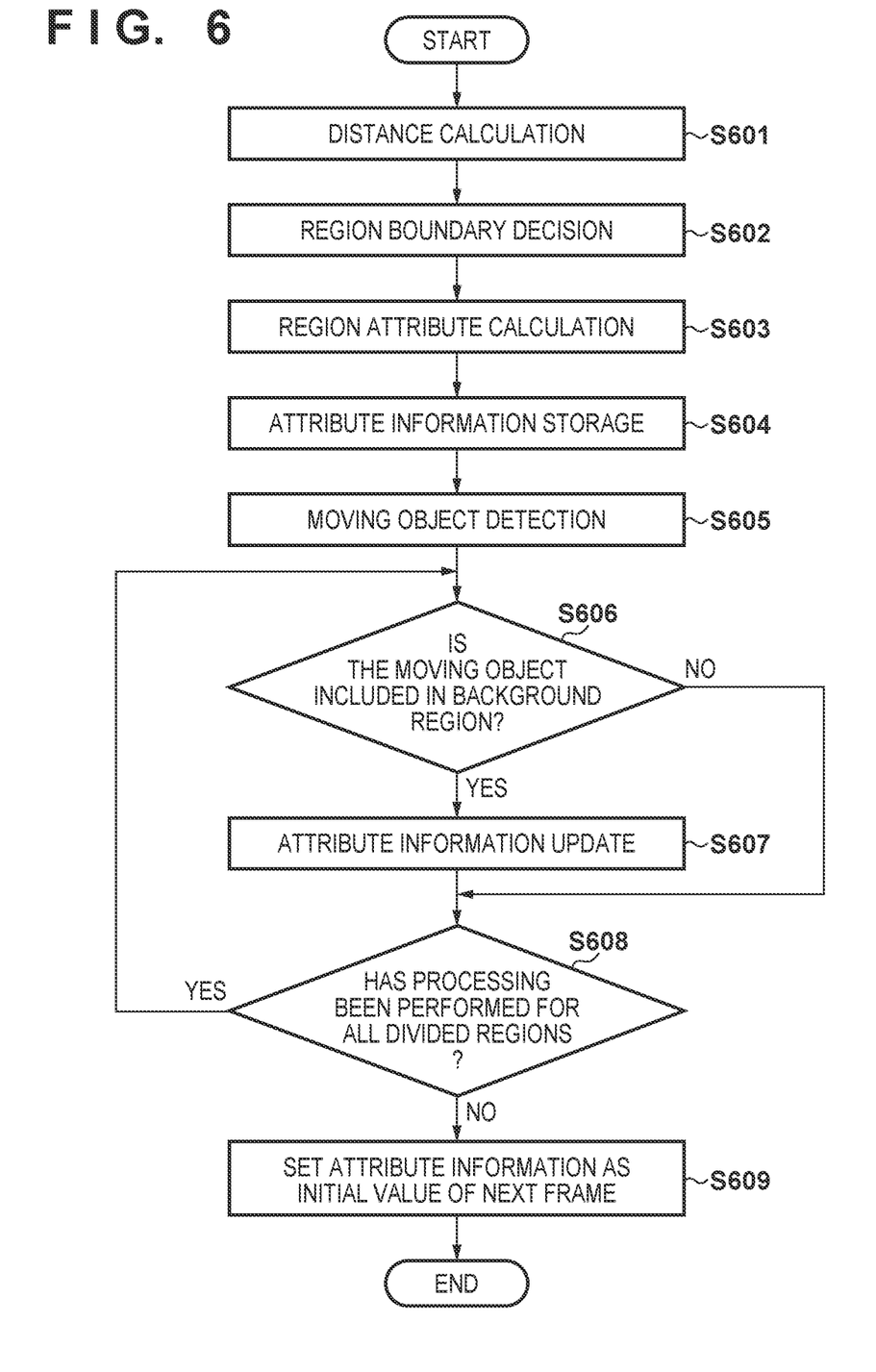
FIG. 6 is a flowchart for illustrating a flow of region division processing according to the first embodiment.

Hereinafter, description regarding details of the region division processing in step S502 will be given using FIG. 6. In the region division processing in the present embodiment, a plurality of representative points are used. Specifically, a coordinate value of each representative point is stored in a memory such as the RAM 203 in association with the identifier of the representative point. Also, the coordinate values of the representative points stored in the memory are set by the initial value setting unit 407 during processing of a single frame image as described later. The distance calculating unit 401 performs processing by using the coordinate values of the representative points that the initial value setting unit 407 set. Note, in a case where region division processing of an initial frame image is performed, it is possible to use arbitrarily set representative points, for example representative points arranged in a lattice pattern within the frame image.

In step S601, for combinations of each pixel of the frame image of interest and each divided region, the distance calculating unit 401 sets an evaluation based on pixel information of the pixel and information of the divided region. In the present embodiment, for each representative point, the distance calculating unit 401 calculates a distance from the representative point to each pixel. The positions of the representative points are set by the initial value setting unit 407 during processing of the previous frame image.

In the present embodiment, it is possible to consider a distance on a color space in addition to a distance on an image as the distance from a representative point to a pixel. For example, the distance calculating unit 401 can set an evaluation depending on a distance from a pixel on a frame image to a representative point of a divided region and a distance from color information of a pixel in a color space to color information of a divided region. The distance calculating unit 401 at this time can use position information of the representative point of the divided region and the color information of the divided region, which are included in the attribute information. As a concrete example, similarly to Achanta, it is possible to use a weighted sum of a distance between color information in a color space (L, a, b) and a distance between coordinates on the image (X,Y) as a distance from a representative point to a pixel. A small distance means that the evaluation of the combination of the pixel and the divided region is high.

As another example, similarly to Pham, it is possible to use a Geodesic distance as a distance from a representative point to a pixel. In such a case, by using position information of a representative point of a divided region, the distance calculating unit 401 can set an evaluation in accordance with a Geodesic distance from the pixel to the representative point of the divided region. A small distance means that the evaluation of the combination of the pixel and the divided region is high. These are nothing more than examples, and other distances or other evaluation methods can be used. In this way, it is possible to select a divided region, selected such that an evaluation set based on pixel information of a pixel and information of a divided region becomes the highest, as a divided region that the pixel belongs to.

In step S602, the region deciding unit 402 decides boundaries of each divided region based on the distances from the representative points. For example, it is possible to perform clustering in accordance with the Achanta's method. Each cluster corresponds to a divided region, and the boundaries of the divided regions can be decided in this way. Also, in accordance with the Pham method, configuration may be taken such that representative points whose distance from respective pixels is smallest are selected and a set of pixels for which the same representative points are selected is associated with one divided region. By these methods, a divided region corresponding to each of the representative point is decided. These are nothing more than examples, and other region division deciding methods can be used.

Next, for each pixel of the frame image, the region deciding unit 402 sets information identifying a corresponding region (region boundary information). The region boundary information is an output of the region division unit 302. For example, by issuing identifiers (region IDs) of the divided regions corresponding to pixels in a raster scan order from the top-left of the frame image, the region deciding unit 402 can generate a label matrix in which region IDs corresponding to each pixel of the frame image are stored. The region deciding unit 402 can temporarily store such a label matrix to the RAM 203 as region boundary information.

In step S603, the attribute deciding unit 403 decides attribute information of each divided region. The attribute information of a divided region is data that can be calculated from the divided region, and includes information regarding a representative point. For example, in a case where the Achanta's region division method is used, the attribute deciding unit 403 can calculate barycentric position information and color average information as the attribute information of the divided regions. Also, in a case where the Pham region division method is used, the attribute deciding unit 403 can calculate barycentric position information as the attribute information of the divided regions. Also, the attribute deciding unit 403 can calculate another value, such as a most frequent color or coordinates of a circumscribing rectangle of a divided region for example, as the attribute information. Note, configuration may be taken such that prior to the processing advancing to step S604, an update of representative points by using region attribute information is performed and the processing of steps S601 to S603 is repeated. In such a case, it is possible to use a barycentric position of a divided region for example as the new position of the corresponding representative point. It is possible to improve the accuracy of a region division by repeating this processing in a range that the processing time allows.

In step S604, the attribute deciding unit 403 temporarily stores the attribute information of each region to the RAM 203 in association with the region ID issued in step S602.

In step S605, the moving object detection unit 405 detects a moving object on the frame image. Although a difference between frames method in which a difference between a previous frame image and a current frame image is used, a background subtraction method in which a difference between a frame image and a background image is used, or the like are given as methods for detecting a moving object, there is no particular limitation thereto. Also, in a case where the type of the moving object (such as a human body or an automobile) is known in advance, it is possible to use a detector for detection thereof.

A method recited in the specification of U.S. Patent Application Publication No. 2007/0237387 for example is given as a method for using a detector. In this method, while scanning an image inputted in a detection window of a predetermined size, a two class classification for classifying whether or not a human body is included in an image in the detection window is performed. In this classification, it is possible to improve the classification accuracy by configuring a classifier by effectively combining many weak classifiers by using AdaBoost. Also, it is possible to configure a cascade type detector connected with series with such a classifier. A weak classifier can operate based on a HOG feature amount. Then, the cascade type detector first removes images that clearly do not include a human body by using a simple classifier in a preceding stage, and then only on images other than these, classification of whether or not the image includes a human body can be performed using a complex classifier of a subsequent stage that has a higher identification capability. It is possible to also detect a moving object of another type such as an automobile by the same processing.

Also, in a case where a frame image is compressed and encoded, it is possible to perform a moving object detection based on post-encoding data. For example, in a case where the frame image is compression encoded by a JPEG format, it is possible to reference DCT coefficients (result of a Discrete Cosine Transformation) which are post-encoding data. Specifically, it is possible to determine that a moving object appeared in a block in which a DCT coefficient changed by greater than or equal to a predetermined value between a previous frame and a current frame. In this way, it is possible to perform moving object detection processing on encoded data in place of performing moving object detection processing on the frame image itself.

In the present embodiment, the moving object detection unit 405 causes the position information of the moving object detected by the method described above to be temporarily stored in the RAM 203. For example, the moving object detection unit 405 can cause two points of X, Y coordinates of the top-left and the bottom-right of a rectangular region surrounding the moving object to be stored in the RAM 203 as position information of the moving object.

In step S606, the attribute update unit 406 determines whether or not a moving object is included in a divided region of interest. In the present embodiment, the attribute update unit 406 determines whether or not the divided region of interest is within the background region. In a case where the divided region of interest is within the background region, it is possible to determine that the moving object is not included in the divided region of interest. For example, the attribute update unit 406 can retrieve the region attribute information that the attribute deciding unit 403 calculated in order of the region IDs to determine whether or not the divided region is within the background region. The attribute update unit 406 can reference the moving object information obtained by the moving object detection unit 405 and determine that the divided region is within the background region if the divided region is not included in the moving object region. For example, in a case where the barycentric position of the divided region included in the region attribute information is not included in any moving object region, the attribute update unit 406 can determine that this divided region is within the background region. In another method, in a case where, referencing the region boundary information, a divided region is not overlapping any moving object region, the attribute update unit 406 can determine that the divided region is within the background region.

In step S607, in a case where the moving object is not included in the divided region of interest in the frame image of interest, the attribute update unit 406 updates the information of the divided region of interest stored in the attribute storage unit 404 by the information of the divided region of interest of the frame image of interest. In the present embodiment, in a case where it is determined that the divided region of interest in the frame image of interest is within the background region in step S606, the attribute update unit 406 updates the region attribute information stored in the attribute storage unit 404 by the region attribute information calculated in step S603. Specifically, the attribute update unit 406 can overwrite the region attribute information having the same region ID as the divided region of interest stored in the attribute storage unit 404 by the region attribute information calculated in step S603 for the divided region of interest. Meanwhile, for the divided region not determined to be within the background region in step S606, the attribute update unit 406 does not update the region attribute information stored in the attribute storage unit 404. In this way, the region attribute information of divided regions in which the moving object appears is not updated. The updating method is not particularly limited, and configuration may be taken such that the attribute storage unit 404 stores a weighted sum of the region attribute information stored in the attribute storage unit 404 and the region attribute information calculated in step S603, for example.

In step S608, the attribute update unit 406 determines whether or not the processing of step S606 to step S607 has been performed for all divided regions. Then, the attribute update unit 406 performs the processing of step S606 to step S607 on other divided regions until the processing has been performed for all divided regions.

In step S609, the initial value setting unit 407 stores an initial value of each of the representative point in a memory such as the RAM 203 based on the region attribute information read from the attribute storage unit 404. For example, the initial value setting unit 407 can set the coordinates of the barycentric position of each divided region as the initial value of the coordinates of corresponding representative points. The initial values of the representative points set in this way are used when the distance calculating unit 401 processes the next frame image.

According to the above processing, the representative points used in the region division of the next frame image are decided by using the attribute information of the divided regions included in the background region in the current frame image. Also, the attribute information of the divided regions included in the moving object region in the current frame image is not used. For this reason, it is possible to suppress the order of the divided regions switching because it is possible to suppress the representative points shifting in the direction of movement of the moving object in the moving object region. Accordingly, it is possible to reduce processing occurring due to the order of the divided regions switching, in a subsequent stage of processing (color correction processing in the present embodiment). In any case, the method according to the present embodiment is not merely used to reduce the processing amount of a subsequent stage, but rather it can be used in combination with processing of a subsequent stage in which there is a possibility that the processing result may change if the arrange-

Second Embodiment

In the first embodiment, detection of a moving object is performed by using the moving object detection unit 405 in addition to the attribute update unit 406 and the attribute storage unit 404. In the second embodiment, a background model is generated by using attribute region information and detection of a moving object is performed by a background subtraction method. By virtue of this configuration, it is possible to omit the moving object detection unit 405. Note, it is possible to use the method recited in Japanese Patent Laid-Open No. 2015-197816 as the moving object detection method according to a background subtraction method using region attribute information, and a simple description thereof is given below.

A hardware configuration, a functional configuration, and a general flow of processing of the image processing apparatus according to the second embodiment are the same as those in the first embodiment. Hereinafter, description regarding configurations similar to those in the first embodiment is omitted. The second embodiment is different to the first embodiment in the configuration and the processing of the region division unit 302, and this difference will be mainly described below.

Figure 7:
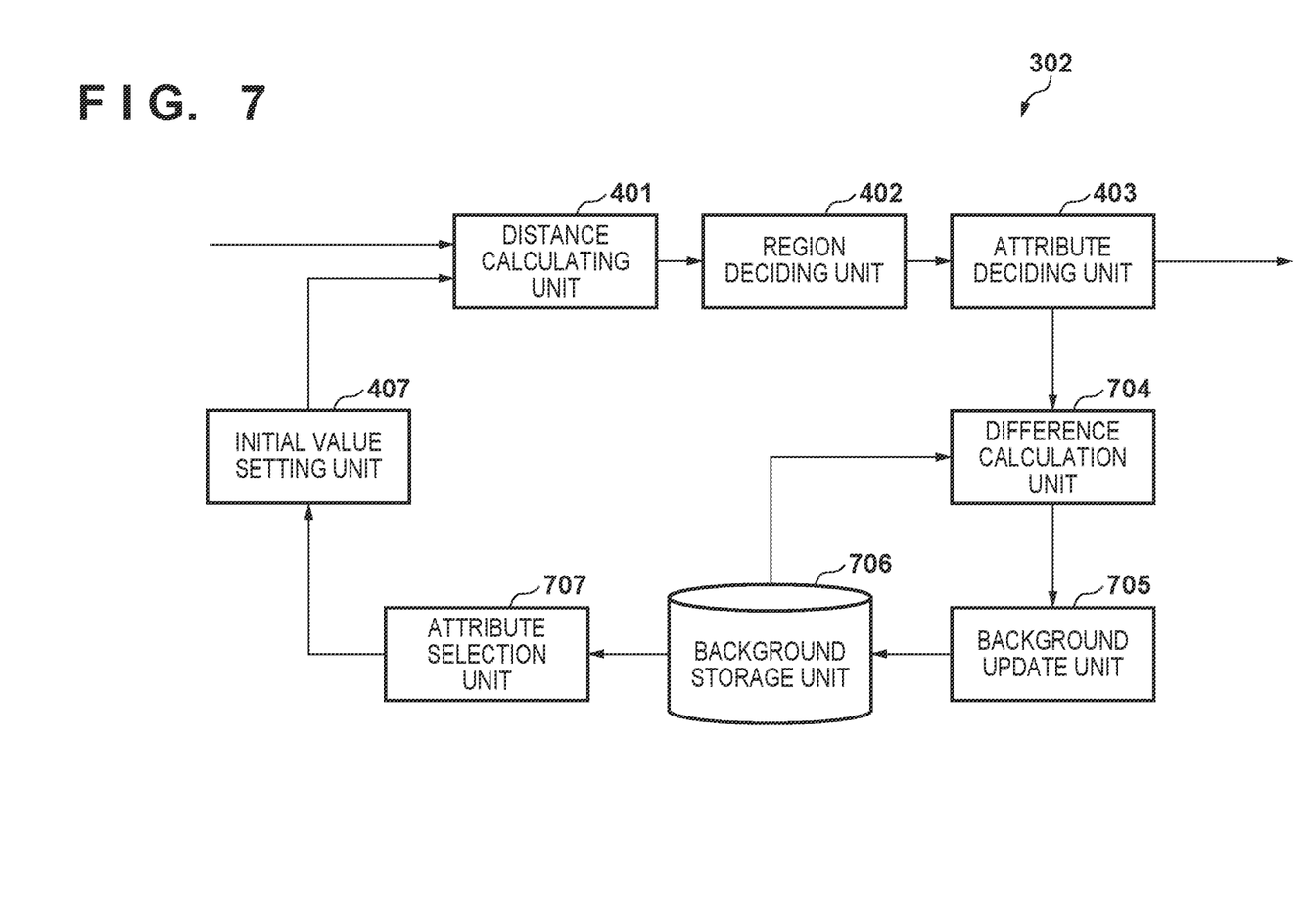
FIG. 7 is a view illustrating a functional configuration of a region division unit according to a second embodiment.

Firstly, description of a detailed functional configuration of the region division unit 302 is given using FIG. 7. The configurations of the distance calculating unit 401, the region deciding unit 402, the attribute deciding unit 403, and the initial value setting unit 407 are the same as in the first embodiment. A difference calculation unit 704 reads region attribute information from a background storage unit 706, and calculates a difference with region attribute information extracted from a current frame image. A background update unit 705 updates a background model stored in the background storage unit 706. It is possible to learn a change of a background (such as a change of an illumination condition) by the background update unit 705. The background storage unit 706 stores information of divided regions (region attribute information for example) as the background model, and corresponds to the attribute storage unit 404 of the first embodiment. The background storage unit 706 can be realized by using a memory such as the RAM 203 or the secondary storage apparatus 204. An attribute selection unit 707 selects the region attribute information used for region division of the next frame image from the background storage unit 706.

Figure 8:
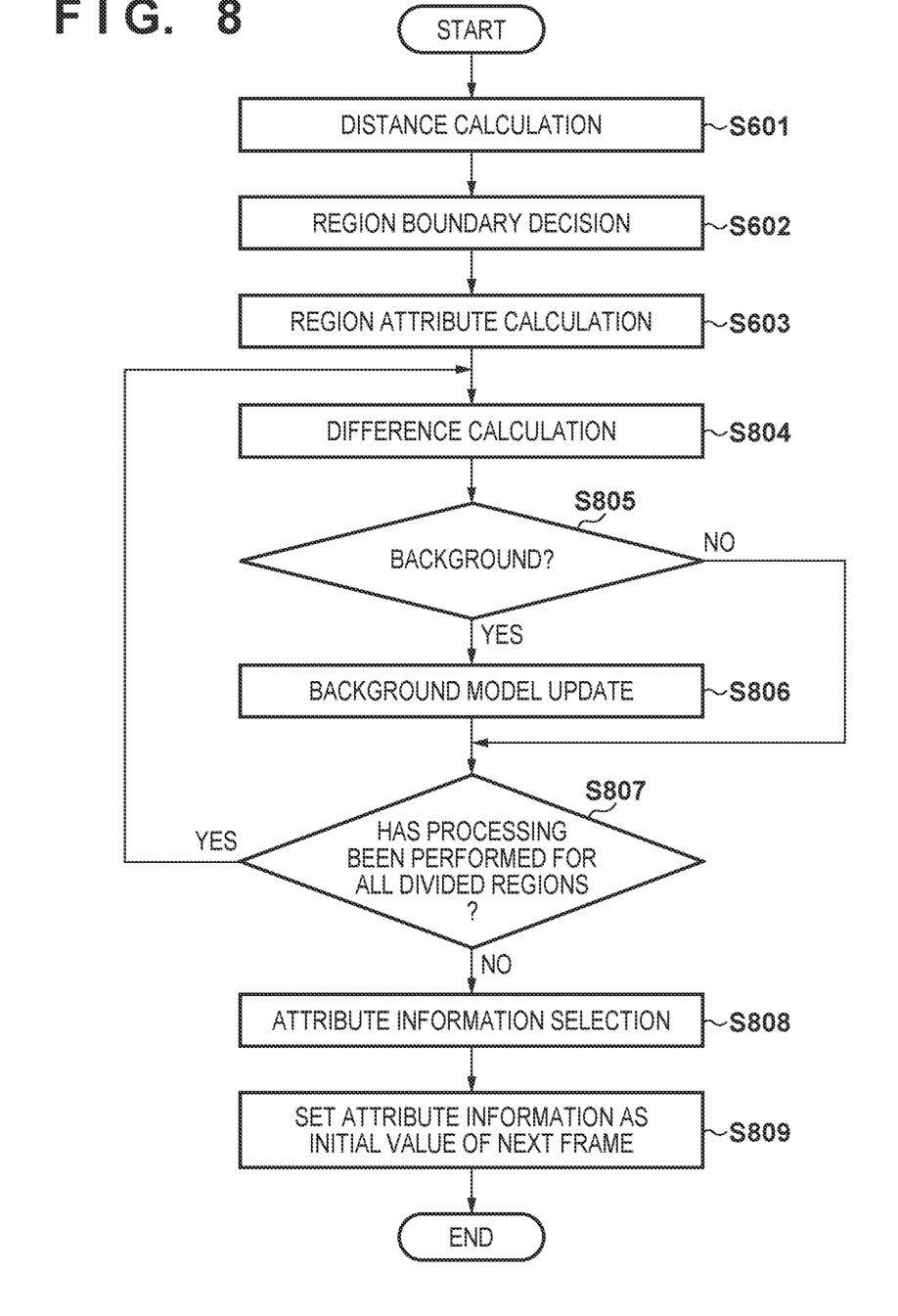
FIG. 8 is a flowchart for illustrating a flow of region division processing according to the second embodiment.

Next, description regarding details of the region division processing according to the present embodiment is given using FIG. 8. The processing of steps S601 to S603 are the same as in the first embodiment. In step S804 and step S805, the difference calculation unit 704 determines whether or not a moving object is included in a divided region of interest by comparing information of the divided region of interest in the frame image of interest and information of the divided region of interest stored in the background storage unit 706. In step S804, for the divided region of interest, the difference calculation unit 704 obtains a difference between the region attribute information read from the background storage unit 706 and the region attribute information calculated regarding the current frame image in step S603. In the present embodiment, the barycentric position of the divided region is included in the region attribute information. Also, in a case where the method recited in Japanese Patent Laid-Open No. 2015-197816 is used, a feature vector of an image within the divided region is included in the region attribute information. The difference calculation unit 704 can obtain a difference by using a barycentric position, a feature vector, or a combination of these. Also, the difference calculation unit can obtain a difference regarding additional region attribute information obtained from the image within the divided region.

The background model stored in the background storage unit 706 is configured by the region attribute information calculated for each divided region. The background model is created by using the region attribute information obtained from an initial frame image at a time of a start of the processing with respect to a video input, and is updated during processing with respect to the video input by the background update unit 705 as described later.

In step S805, the difference calculation unit 704 determines whether the divided region of interest is in the background region or in a moving object region based on the difference calculated in step S804. In the present embodiment, the difference calculation unit 704 determines that the divided region is in the background region if the difference is less than a predetermined value and that the divided region is in a moving object region if the difference is greater than or equal to the predetermined value. In this way, whether the divided region is included in the background region (whether a moving object is included in the divided region) is determined by the comparison of the region attribute information.

In a case where the divided region of interest is determined to be in the background region, the background update unit 705 in step S806 uses the region attribute information calculated in step S603 to update the region attribute information for the divided region of interest that the background storage unit 706 stores. The background changes with time, for example the brightness of the background changes from noon to the evening. The attribute region information that the background storage unit 706 stores is updated to reflect such a change in the background. As a concrete example, the background update unit 705 can overwrite the attribute region information that the background storage unit 706 stores by the attribute region information obtained for the current frame. As another method, the background update unit 705 can overwrite the attribute region information that the background storage unit 706 stores by a weighted sum of a value that the attribute region information of the current frame indicates and a value that the attribute region information that the background storage unit 706 stores indicates.

Also, for one divided region, the background storage unit 706 may store a plurality of pieces of information of the divided region each associated with the time information. For example, for one divided region, a plurality of sets of attribute region information may be stored. By virtue of such a configuration, it is possible to respectively store the region attribute information corresponding to a plurality of states, noon and the evening for example, in the background storage unit 706. In such a case, the background update unit 705 can store time information in association with the region attribute information in the background storage unit 706. This time information can indicate, for example, a time when the region attribute information is stored in the background storage unit 706, or a time of obtainment of a frame image used for calculating the region attribute information.

Meanwhile, for a divided region of interest not determined to be within the background region, the background update unit 705 does not update the region attribute information stored in the background storage unit 706. In this way, the region attribute information of divided regions in which the moving object appears is not updated.

In step S807, the background storage unit 706 determines whether or not the processing of step S804 to step S806 has been performed for all divided regions. Then, the background storage unit 706 performs the processing of step S804 to step S806 on other divided regions until the processing has been performed for all divided regions.

In step S808, for each divided region, the attribute selection unit 707 selects the region attribute information from the background storage unit 706. As described above, the region attribute information stored in the background storage unit 706 is obtained based on the region attribute information when it is determined that the divided region belongs to the background region. In a case where the background storage unit 706 only has one piece of background information (region attribute information) for one divided region, the attribute selection unit 707 selects that region attribute information. Meanwhile, in a case where the background storage unit 706 stores a plurality of pieces of divided region information for one divided region, the attribute selection unit 707 can select one from the plurality of pieces of divided region information.

For example, in a case where the background storage unit 706 holds a plurality of pieces of region attribute information for one divided region, the attribute selection unit 707 can select one from the plurality of pieces of region attribute information. At that time, the background storage unit can perform a selection based on the time information. For example, the attribute selection unit 707 can select the region attribute information stored at the time closest to the current time, the current frame image obtainment time, or the next frame image obtainment time. By virtue of such a configuration, it is possible to select attribute region information that is based on a frame image in which a background image which is similar to the current frame image is included. In such a case, when processing the next frame image, the region division unit 302 can reference the information selected based on the time information from among a plurality of pieces of divided region information to divide the next frame image into a plurality of divided regions. Step S609 is performed similarly to in the first embodiment.

By the method of the second embodiment, it is possible to suppress the order of divided regions from switching due to a moving object. Also, by virtue of a configuration in which time information of the background model is additionally considered, it is possible to suppress the influence of a temporal change of a background on region division.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-186143, filed Sep. 23, 2016, which is hereby incorporated by reference herein in its entirety.

What is claimed is:

1. An image processing apparatus comprising:
a memory configured to store instructions; and
a processor communicatively connected to the memory and configured to execute the instructions to perform:
obtaining a video with consecutive frame images;
dividing a frame image of interest into a plurality of divided regions by reference to information of divided regions previously stored in a storage, the information of each divided region indicating a representative position of the divided region;
determining whether or not a moving object is included in a divided region of interest in the frame image of interest; and
switching whether or not to update information indicating the representative position of the divided region of interest stored in the storage with information of a representative position of the divided region of interest of the frame image of interest, according to whether or not a moving object is included in the divided region of interest in the frame image of interest.

2. The image processing apparatus according to claim 1, wherein the processor is further configured to perform updating the information indicating the representative position of the divided region of interest stored in the storage with the information of the representative position of the divided region of interest of the frame image of interest, while a moving object is not included in the divided region of interest in the frame image of interest.

3. The image processing apparatus according to claim 1, wherein the processor is further configured to perform determining whether or not the moving object is included in the divided region of interest in the frame image of interest by performing moving object detection processing on the frame image of interest.

4. The image processing apparatus according to claim 1, wherein the processor is further configured to perform determining whether or not the moving object is included in the divided region of interest in the frame image of interest by comparing information of the representative position of the divided region of interest of the frame image of interest with the information indicating the representative position of the divided region of interest stored in the storage.

5. The image processing apparatus according to claim 1, wherein:
the storage is configured to store, for one divided region, a plurality of pieces of information indicating the representative position of the divided region each associated with time information; and
the processor is further configured to perform dividing the frame image of interest into the plurality of divided regions in accordance with a piece of information selected from the plurality of pieces of information indicating the representative position of the divided regions based on time information.

6. The image processing apparatus according to claim 1, wherein the position information of the divided regions includes barycentric position information of the divided regions.

7. The image processing apparatus according to claim 1, wherein the information of the divided regions further includes color information of the divided regions.

8. The image processing apparatus according to claim 1, wherein the dividing further includes selecting, for each pixel of the frame image of interest, a corresponding divided region of the plurality of divided regions that the pixel belongs to based on an evaluation determined using pixel information of the pixel and information of the corresponding divided region.

9. The image processing apparatus according to claim 8, wherein:
the information of the corresponding divided region further includes position information of a representative point of the corresponding divided region and color information of the corresponding divided region; and
the evaluation is determined in accordance with a distance from the pixel to the representative point of the corresponding divided region on the image and a distance from color information of the pixel to the color information of the corresponding divided region in a color space.

10. The image processing apparatus according to claim 8, wherein:
the information of the corresponding divided region further includes position information of a representative point of the corresponding divided region; and
the evaluation is determined in accordance with a Geodesic distance from the pixel to the representative point of the corresponding divided region.

11. The image processing apparatus according to claim 1, wherein the processor is further configured to execute the instructions to perform controlling, in accordance with whether or not a difference of each divided region of the plurality of divided regions between a previous frame image and a current frame image is equal to or lower than a threshold, whether or not to calculate a parameter for performing correction processing on each divided region of the plurality of divided regions of the current frame image.

12. An image processing method comprising:
obtaining a video with consecutive frame images;
dividing a frame image of interest into a plurality of divided regions by reference to previously stored information of divided regions, the information of each divided region indicating a representative position of the divided region;
determining whether or not a moving object is included in a divided region of interest in the frame image of interest; and
switching whether or not to update the previously stored information indicating the representative position of the divided region of interest with information of a representative position of the divided region of interest of the frame image of interest, in accordance with whether or not a moving object is included in the divided region of interest in the frame image of interest.

13. A non-transitory computer-readable medium storing a program for causing a computer to:
obtain a video with consecutive frame images;
divide a frame image of interest into a plurality of divided regions by reference to previously stored information of divided regions, the information of each divided region indicating a representative position of the divided region;
determine whether or not a moving object is included in a divided region of interest in the frame image of interest; and
switch whether or not to update the previously stored information indicating the representative position of the divided region of interest with information of a representative position of the divided region of interest of the frame image of interest, in accordance with whether or not a moving object is included in the divided region of interest in the frame image of interest.

* * * * *